United States Patent
Ichie et al.

(10) Patent No.: US 8,719,439 B2
(45) Date of Patent: May 6, 2014

(54) CONTENT TRANSMITTING AND RECEIVING DEVICE, CONTENT TRANSMITTING AND RECEIVING METHOD, AND CONTENT TRANSMITTING AND RECEIVING PROGRAM PRODUCT

(75) Inventors: Akira Ichie, Saitama (JP); Masashi Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 262 days.

(21) Appl. No.: 13/229,225

(22) Filed: Sep. 9, 2011

(65) Prior Publication Data
US 2012/0158892 A1 Jun. 21, 2012

(30) Foreign Application Priority Data
Dec. 21, 2010 (JP) ................................ 2010-284318

(51) Int. Cl.
*G06F 15/16* (2006.01)

(52) U.S. Cl.
USPC .......................................... 709/231; 709/203

(58) Field of Classification Search
USPC .............. 709/231, 230, 203, 217, 219; 725/1, 725/110, 134
See application file for complete search history.

(56) References Cited

U.S. PATENT DOCUMENTS

| | | | |
|---|---|---|---|
| 7,650,442 B2 * | 1/2010 | Ashley et al. ..................... 710/31 |
| 8,358,912 B2 * | 1/2013 | Ryu et al. ....................... 386/291 |
| 2005/0033912 A1 | 2/2005 | Abe | |
| 2006/0041596 A1 * | 2/2006 | Stirbu et al. ..................... 707/200 |
| 2006/0168126 A1 | 7/2006 | Costa-Requena et al. | |
| 2006/0168211 A1 * | 7/2006 | Koike ........................... 709/225 |
| 2006/0184851 A1 * | 8/2006 | Froidcoeur et al. ........... 714/746 |
| 2006/0242664 A1 * | 10/2006 | Kikkawa et al. ................. 725/37 |
| 2007/0219953 A1 * | 9/2007 | Mak ................................. 707/3 |
| 2008/0015932 A1 * | 1/2008 | Haeuser et al. ................... 705/14 |
| 2008/0052347 A1 * | 2/2008 | Jung et al. ...................... 709/203 |
| 2008/0133781 A1 * | 6/2008 | Ashley et al. ..................... 710/17 |
| 2008/0162716 A1 * | 7/2008 | Kayanuma et al. ........... 709/231 |
| 2008/0235198 A1 * | 9/2008 | Duncan et al. ..................... 707/4 |

(Continued)

FOREIGN PATENT DOCUMENTS

| | | |
|---|---|---|
| JP | 2002-171376 | 6/2002 |
| JP | 2003-158548 | 5/2003 |

(Continued)

OTHER PUBLICATIONS

Japanese Patent Application No. 2010-284318, Decision of Rejection, mailed Feb. 7, 2012, (with English Translation).

(Continued)

*Primary Examiner* — LaShonda Jacobs
(74) *Attorney, Agent, or Firm* — Blakely, Sokoloff, Taylor & Zafman LLP

(57) ABSTRACT

According to one embodiment, a content transmitting and receiving device includes:
 a content designator receiver receiving a content designator as a uniform resource identifier (URI) over a network;
 a content transmitter function identifier extracting module extracting a content transmitter function identifier from the received content designator;
 a content transmitter function identifier comparator comparing the extracted content transmitter function identifier with a content transmitter function identifier stored in the content transmitting and receiving device;
 a content obtaining method switching module switching between internal transfer of content and external transfer of content over the network based on a comparison result of the content transmitter function identifier comparator; and
 a content reader reading a designated content from a content accumulating module, wherein
 if the content obtaining method switching module switches to the internal transfer, the content reader transmits the read designated content to the content receiver function module through the internal transfer.

16 Claims, 7 Drawing Sheets

(56) References Cited

U.S. PATENT DOCUMENTS

| | | | |
|---|---|---|---|
| 2009/0055557 A1* | 2/2009 | Namai et al. | 710/14 |
| 2009/0202222 A1* | 8/2009 | Kageyama et al. | 386/68 |
| 2009/0208185 A1* | 8/2009 | Barton et al. | 386/68 |
| 2009/0240785 A1 | 9/2009 | Kikkawa | |
| 2010/0131991 A1* | 5/2010 | Tao | 725/80 |
| 2010/0180312 A1* | 7/2010 | Toya | 725/78 |
| 2010/0182437 A1* | 7/2010 | Shin et al. | 348/207.1 |
| 2012/0210205 A1* | 8/2012 | Sherwood et al. | 715/234 |
| 2012/0260169 A1* | 10/2012 | Schwartz et al. | 715/716 |
| 2012/0324584 A1* | 12/2012 | Al-Shaykh et al. | 726/26 |

FOREIGN PATENT DOCUMENTS

| | | |
|---|---|---|
| JP | 2004-056191 | 2/2004 |
| JP | 2005-056200 | 3/2005 |
| JP | 2006-313502 | 11/2006 |
| JP | 2008-524736 | 7/2008 |
| JP | 2009-110122 | 5/2009 |
| JP | 2009-231974 | 10/2009 |
| JP | 2010-114721 | 5/2010 |

OTHER PUBLICATIONS

Japanese Patent Application No. 2010-284318, Decision to Grant a Patent, mailed Jun. 29, 2012, (with English Translation).

Japanese Patent Application No. 2010-284318, Notice of Rejection, mailed Nov. 1, 2011, (with English Translation).

* cited by examiner

FIG.9

CONTENT DESIGNATOR http://192.168.0.100:10000/video/hdd/content_00000123.mpg

FIG.10

CONTENT TRANSMITTER FUNCTION IDENTIFIER 192.168.0.100

FIG.11

CONTENT REQUEST

GET /video/hdd/content_00000123.mpg HTTP/1.1
HOST: 192.168.0.100:10000

CONTENT TRANSMITTING AND RECEIVING DEVICE, CONTENT TRANSMITTING AND RECEIVING METHOD, AND CONTENT TRANSMITTING AND RECEIVING PROGRAM PRODUCT

CROSS-REFERENCE TO RELATED APPLICATIONS

This application is based upon and claims the benefit of priority from Japanese Patent Application No. 2010-284318, filed on Dec. 21, 2010, the entire contents of which are incorporated herein by reference.

FIELD

Embodiments described herein relate generally to a content transmitting and receiving device, a content transmitting and receiving method, and a content transmitting and receiving program product.

BACKGROUND

Electronics devices compliant with the Universal Plug and Play (trademark) Audio Visual (UPnP AV) standard and the Digital Living Network Alliance (DLNA) guidelines are coming to use. The UPnP (trademark) AV standard specifies a set of protocols designed for replaying AV content and the like as a layer located above the UPnP (trademark) protocols, which allow an electronics device to join a network simply by being connected thereto. The DLNA guidelines are industry standards for providing interoperability to electronics devices and for enabling deployment of a home network of electronics devices. The DLNA guidelines have adopted the UPnP (trademark) protocols as protocols for establishing communications between the electronics devices.

The UPnP (trademark) standard defines a device and a control point at which the device is controlled. As types of a device, the UPnP (trademark) AV standard defines a media server (UPnP (trademark) AV Media Server) functioning to accumulate therein content and a media renderer (UPnP (trademark) AV Media Renderer) functioning to replay content. At a control point (UPnP (trademark) AV Control Point), a device connected to a network is discovered and the device is controlled. According to the UPnP (trademark) AV standard, such control is performed that a media renderer selected at a control point is caused to obtain over a network content stored in a media server selected at the control point and to replay the content.

According to protocols such as those specified in the UPnP (trademark) AV standard, even when a single device provides both a content transmitter function module corresponding to a media server for storing therein content designated by a control terminal, e.g., a control point, and a content receiver function module corresponding to a media renderer, the content will still be transmitted and received over a network in the same manner as when these functions are provided by separate physical entities.

However, resources could be consumed in a wasteful manner if the content is transferred over the network instead of being transferred internally in the single device comprising both the content transmitter function module and the content receiver function module. Furthermore, depending on the specifications of a content transmitting and receiving device comprising both the content transmitter function module and the content receiver function module, or depending on the resource utilizations thereby, the content transmitter function module might be incapable of transferring content.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 9 is an exemplary schematic diagram of a content designator in the embodiment;

FIG. 10 is an exemplary schematic diagram of a content transmitter function identifier in the embodiment; and FIG. 11 is an exemplary schematic diagram of a content request as an HTTP GET request message in the embodiment.

DETAILED DESCRIPTION

Various embodiments will be described in detail hereinafter with reference to some drawings. Each device according to the embodiments described hereinafter is explained to be compliant with the UPnP (trademark) AV standard and the DLNA guidelines. However, the embodiment is not limited thereto, and configurations characterizing the embodiments explained hereinafter are also applicable to a device or a system compliant with a standard and the like being equivalent to or interoperable with the standard and the guidelines, or to a device or a system with customized specifications.

Overall Configuration

To begin with, explained generally below is the overall configuration of a network system comprising a plurality of electronics devices compliant with the UPnP (trademark) AV standard and the DLNA guidelines, that is, operating according to these standards, as an embodiment.

Figure 1:
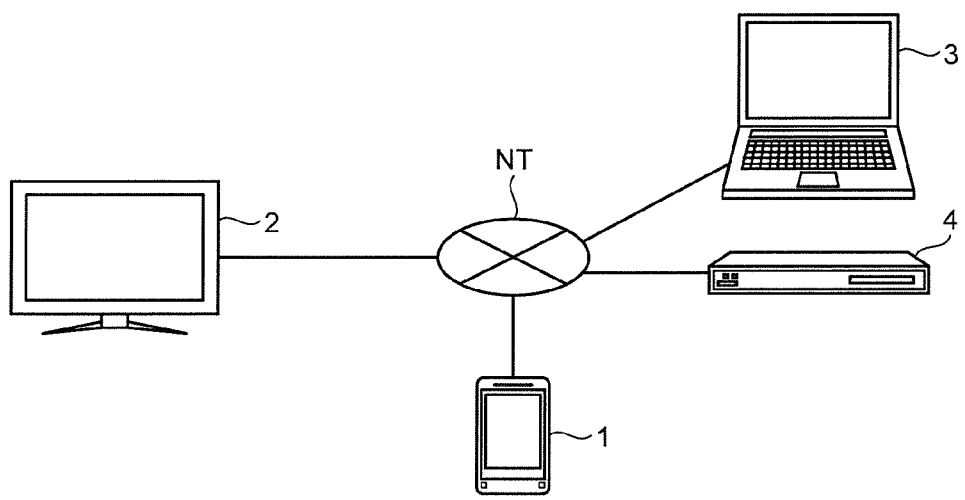
FIG. 1 is an exemplary schematic diagram of the overall configuration of a network system according to an embodiment in which a plurality of electronics devices compliant with the UPnP (trademark) AV standard and the DLNA guidelines are connected over a network.

FIG. 1 is a schematic diagram of the overall configuration of a network system according to an embodiment in which a plurality of electronics devices compliant with the UPnP (trademark) AV standard and the DLNA guidelines are connected over a network. In FIG. 1, a television receiver 2, an information processing apparatus 3 such as a personal computer (PC), and a recorder 4 such as a hard disk drive (HDD) recorder and a Blu-ray (registered trademark) disk recorder are connected as devices as defined in the UPnP (trademark) standard to a control terminal 1 such as a mobile terminal as a control point as defined in the same standard over a network such as a local area network (LAN). The network may be a wired network or a wireless network, or may be a combination of these. The number and types of devices connected to the network are not limited to the example illustrated in FIG. 1, and various devices compliant with the UPnP (trademark) AV standard may also be connected to the network.

As mentioned above, the UPnP (trademark) AV standard defines a device functioning to accumulate therein content as a media server (UPnP (trademark) AV Media Server), such as the television receiver 2, the information processing apparatus 3, and the recorder 4 with a function for accumulating therein content, e.g., a recording function, and also defines a device functioning to replay content as a media renderer (UPnP (trademark) AV Media Renderer), such as the television receiver 2 and the information processing apparatus 3 with a function for replaying content. Hereinafter, the function of the media server, which accumulates therein content, provides content information to a control point (UPnP (trademark) AV Control Point), and supplies designated content to a media renderer in response to a request made thereby, is simply referred to as a content transmitter function; and the function of a media renderer, which receives designated content from a media server in response to a request made by a control point and replays the content, is referred to as a content receiver function. A device comprising both the content transmitter function and the content receiver function is hereinafter referred to as a content transmitting and receiving device. A content transmitting and receiving device is a device comprising a content transmitter function as viewed from another device and also a device comprising a content receiver function as viewed from another device.

In the content transmitting and receiving device according to the embodiment, a content receiver function module in the content transmitting and receiving device operates to receive content either from an external device comprising a content transmitter function over a network or from a content transmitter function module of the own device via an internal channel, based on a content designator received from the control terminal 1 over the network.

Overview of Operations of Each Device

The overview of the operations performed by each device included in the network system illustrated in FIG. 1 will now be explained.

Figure 2:
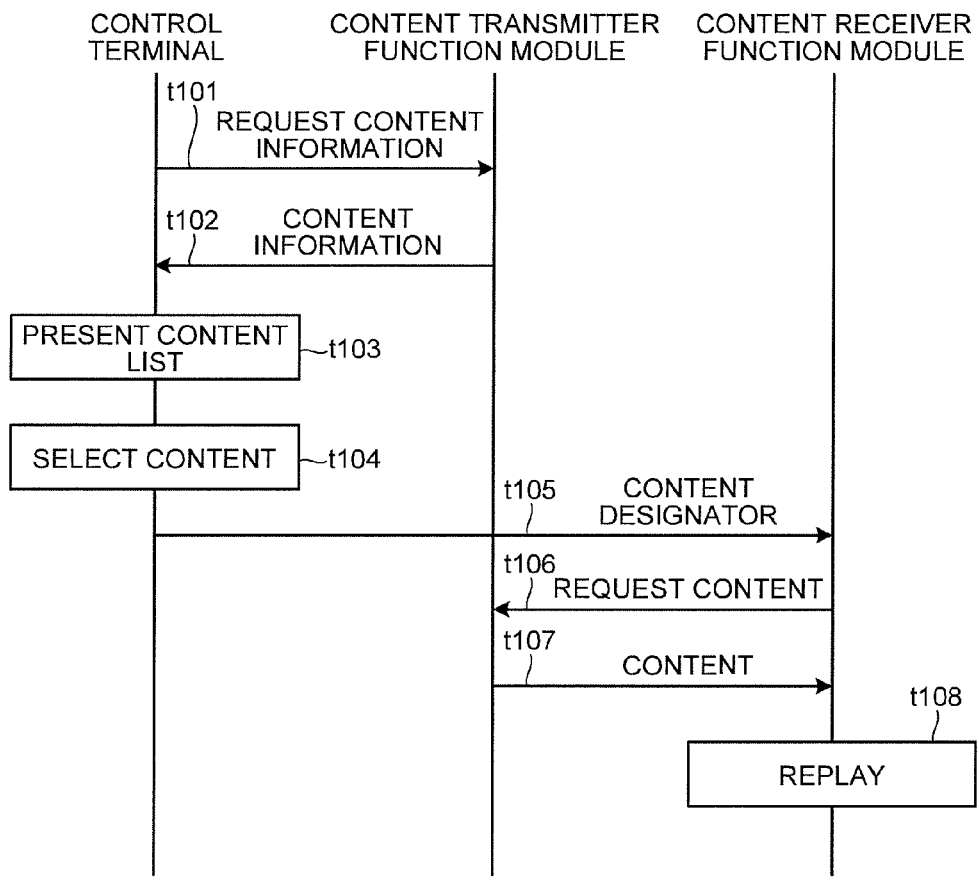
FIG. 2 is an exemplary sequence diagram for explaining operations performed between devices in the embodiment.

FIG. 2 is a sequence diagram for explaining the overview of the operations performed between the devices. In FIG. 2, a device comprising a content transmitter function or a content transmitter function module in a content transmitting and receiving device is simply referred to as a content transmitter function. A device comprising a content receiver function or a content receiver function module in a content transmitting and receiving device is simply referred to as a content receiver function. It is assumed here that the control terminal 1 has already searched each of the devices on a network NT using the UPnP (trademark) protocols, and a user has selected one of the devices comprising the content receiver function, including the content transmitting and receiving device, through an operation performed with the control terminal 1.

The control terminal 1 compliant with the UPnP (trademark) AV standard requests a device comprising the content transmitter function, such as the recorder 4, or the content transmitter function module in the content transmitting and receiving device to send content information over the network NT (t101), and obtains the content information from the corresponding device (t102).

The control terminal 1 then provides a content list to a user who is operating the control terminal 1 (displays the list on a display of the control terminal 1, for example) (t103).

The content information given from the device comprising the content transmitter function or from the content transmitter function module in the content transmitting and receiving device contains information used for providing the content list to a user and information used for making up a content designator, such as meta-information for each content (title name, content type, artist, genre, replay time, and date of creation) and a content uniform resource locator (URL). A content designator is a uniform resource identifier (URI) of specific content, and is notified by the control terminal 1, which is a control point, to the device comprising the content receiver function, in the form of an argument for a SetAVTransportURI action, which is specified under the UPnP (trademark) AV Transport Service. The URI of specific content also contains the identifier of the device comprising the content transmitter function storing therein the specific content. The identifier includes an Internet protocol (IP) address of the device comprising the content transmitter function, and may also include a port number.

FIG. 9 is a schematic diagram of an example of the content designator used in the embodiment. In this example, following "http://", the IP address (192.168.0.100) and the port number (10000) of the device comprising the content transmitter function are specified, further followed by the path to specific content (/video/hdd/content_00000123.mpg). When a plurality of pieces of content are accumulated in the device comprising the content transmitter function, a plurality of content designators and a plurality of pieces of attribute information are included in the content information given from the device comprising the content transmitter function. As the content information provided to a user, a file name (content_00000123.mpg, . . . ), a title name, or the like of each of the content may be used. The IP address included in the content designator is used as a content transmitter function identifier (FIG. 10) in this embodiment.

The user operating the control terminal 1 then selects content to be replayed from the content information presented to the user (t104).

The control terminal 1 then extracts or generates a content designator from the content information of the content selected by the user (designated content), and transmits the content designator to the device comprising the content receiver function selected by the user, using the SetAVTransportURI action to cause the content selected by the user to be replayed (t105).

The device comprising the content receiver function or the content receiver function module requests the device comprising the content transmitter function storing therein the designated content to send the designated content based on the content designator received from the control terminal 1 (t106), obtains the designated content (t107), and replays the designated content (t108).

A content request transmitted over the network NT is a Hypertext Transfer Protocol (HTTP) GET request message or a Real Time Streaming Protocol (RTSP) message addressed to the URI of the designated content, and is transmitted from a content receiver function module to an external device comprising the content transmitter function. An example of a content request transmitted as an HTTP GET request message is illustrated in FIG. 11. In the example illustrated in FIG. 11, "GET" is followed by a description of the path to the content (/video/hdd/content_00000123.mpg), the version of HTTP (HTTP/1.1), and the IP address (192.168.0.100) and the port number (10000) of the host.

On the other hand, when the content is requested from the content transmitter function module included in the same device, the content receiver function module issues a predetermined command instructing to transfer the content internally to the content transmitter function module included in the same device.

Control Terminal

Figure 3:
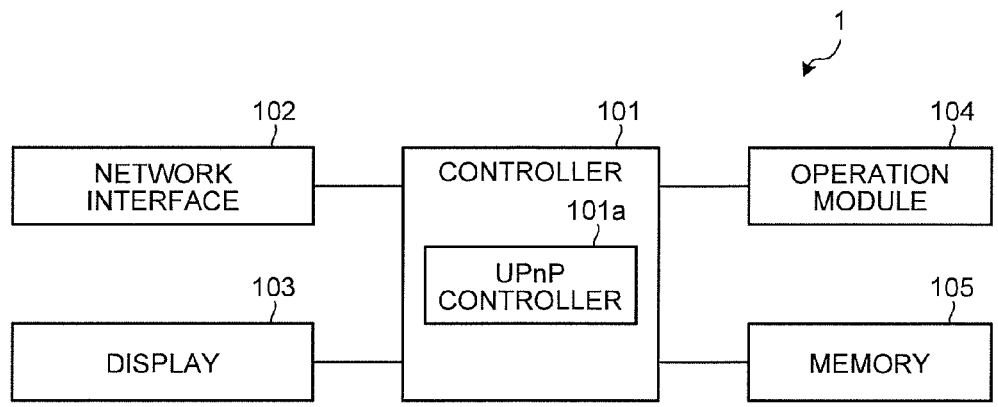
FIG. 3 is an exemplary block diagram of a functional configuration of a control terminal in the embodiment.

FIG. 3 is a block diagram of a functional configuration of the control terminal 1. As illustrated in FIG. 3, the control terminal 1 comprises a controller 101, a network interface 102, a display 103, an operation module 104, and a memory 105.

The controller 101 comprises a microcontroller, a central processing unit (CPU), a random access memory (RAM), and a read-only memory (ROM), and controls the operations of the control terminal 1 centrally. For example, the CPU loads various computer programs stored in the ROM into a working area on the RAM, executes the computer programs sequentially, and outputs control signals to each module included in the control terminal 1 to control the operations of each of these modules.

The network interface 102, as a communicating module, is an interface for performing communications over the network NT under the control of the controller 101. More specifically, the network interface 102 performs communications according to the UPnP (trademark) AV standard to communicate with devices such as the television receiver 2, the information processing apparatus 3, and the recorder 4 over the network NT.

The display 103 is a liquid crystal display (LCD), for example, and displays thereon an operation screen or an error indication screen under the control of the controller 101. The control terminal 1 notifies a user of the result of a process via a screen displayed on the display 103. The control terminal 1 may also notify a user by means of sounds output from a speaker (not illustrated) that outputs sounds under the control of the controller 101.

The operation module 104 includes operation keys or a touch panel for receiving operation instructions from a user. Operation instructions received from a user are notified to the controller 101. The memory 105 is a RAM or rewritable nonvolatile memory, for example.

The controller 101 comprises a UPnP controller 101a as a functional component according to the embodiment. The UPnP controller 101a controls communications performed by the network interface 102 over the network NT according to the UPnP (trademark) AV standard. More specifically, the controller 101 searches a device connected to the network NT, obtains predetermined information such as content information from the searched device, and controls communications related to an action issued to the searched device. The information obtained from each of the devices is stored in a memory such as the RAM in the memory 105 under the control of the UPnP controller 101a.

Hardware Structure of Television Receiver

As a typical example of the device comprising the content transmitter function and the content receiver function module (in other words, the content transmitting and receiving device) according to the embodiment, the television receiver 2 will now be explained with reference to FIG. 4.

Figure 4:
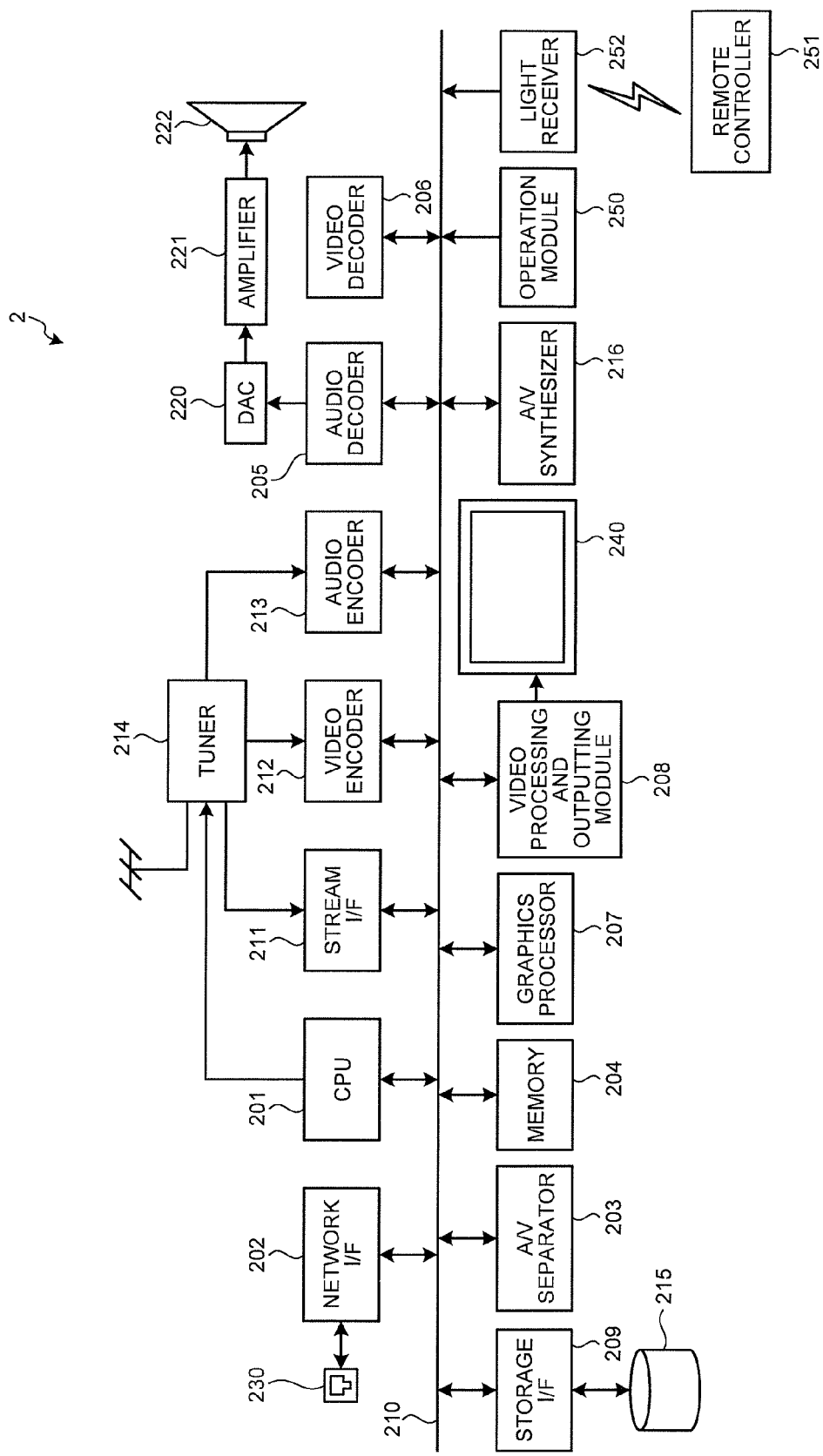
FIG. 4 is an exemplary block diagram of a hardware structure of a television receiver in the embodiment.

FIG. 4 is a block diagram of a hardware structure of the television receiver 2. As illustrated in FIG. 4, the television receiver 2 comprises a CPU 201, a network interface (I/F) 202, an audio-and-video (A/V) separator 203, a memory 204, an audio decoder 205, a video decoder 206, a graphics processor 207, a video processing and outputting module 208, a storage I/F 209, a bus 210, a stream I/F 211, a video encoder 212, an audio encoder 213, a tuner 214, a hard disk drive (HDD) 215, an A/V synthesizer 216, a digital-to-analog converter (DAC) 220, an amplifier 221, a speaker 222, a terminal 230, a display panel 240, an operation module 250, a remote controller 251, and a light receiver 252.

An analog video signal received by the tuner 214 is encoded by the video encoder 212. An analog audio signal received by the tuner 214 is encoded by the audio encoder 213. The encoded video signal and audio signal are synthesized into a stream by the A/V synthesizer 216. A digital video signal received by the tuner 214 is input as a stream in the Moving Picture Experts Group 2 Transport Stream (MPEG2-TS) format, for example, via the stream I/F 211. The streams are recorded in the HDD 215 via the storage I/F 209.

The terminal 230 is an Ethernet (registered trademark) terminal, for example, for connection with the network NT. The television receiver 2 receives information input from another device comprising the content transmitter function on the network NT via the terminal 230 and the network I/F 202.

The A/V separator 203 separates the stream recorded in the HDD 215 or content data input from another device comprising the content transmitter function via the terminal 230 and the network I/F 202 and temporarily stored in the memory 204 into video data and audio data under the control of the CPU 201. The separated video data is decoded by the video decoder 206. The decoded video data is output from the video processing and outputting module 208 as a video signal and displayed on the display panel 240. The audio data separated by the A/V separator 203 is decoded by the audio decoder 205, passed through the DAC 220 and the amplifier 221, and output from the speaker 222.

The CPU 201 executes various computer programs stored in a storage medium such as the HDD 215 or a ROM (not illustrated) to control the overall operations of the television receiver 2. More specifically, the CPU 201 cooperates with the graphics processor 207 to create a display screen such as a graphical user interface (GUI), for example, stores the display screen in the memory 204 such as a RAM, and reads and displays the display screen as appropriate onto the display panel 240. When the CPU 201 receives operations performed with the remote controller 251, for example, on the television receiver 2 via the operation module 250 or the light receiver 252, the CPU 201 switches, in response to the operations, broadcasting signals (channels) received by the tuner 214 or detects inputs entered on the GUI display screen.

Functional Configuration of Television Receiver as Content Transmitting and Receiving Device A functional configuration of the television receiver 2 as a content transmitting and receiving device will now be explained with reference to FIG. 5. The functional configuration explained hereinafter may be applied to any device comprising both the content transmitter function module and the content receiver function module as a content transmitting and receiving device. Furthermore, it is merely a matter of device design choice as to which part of specific hardware functions as a certain functional component.

Figure 5:
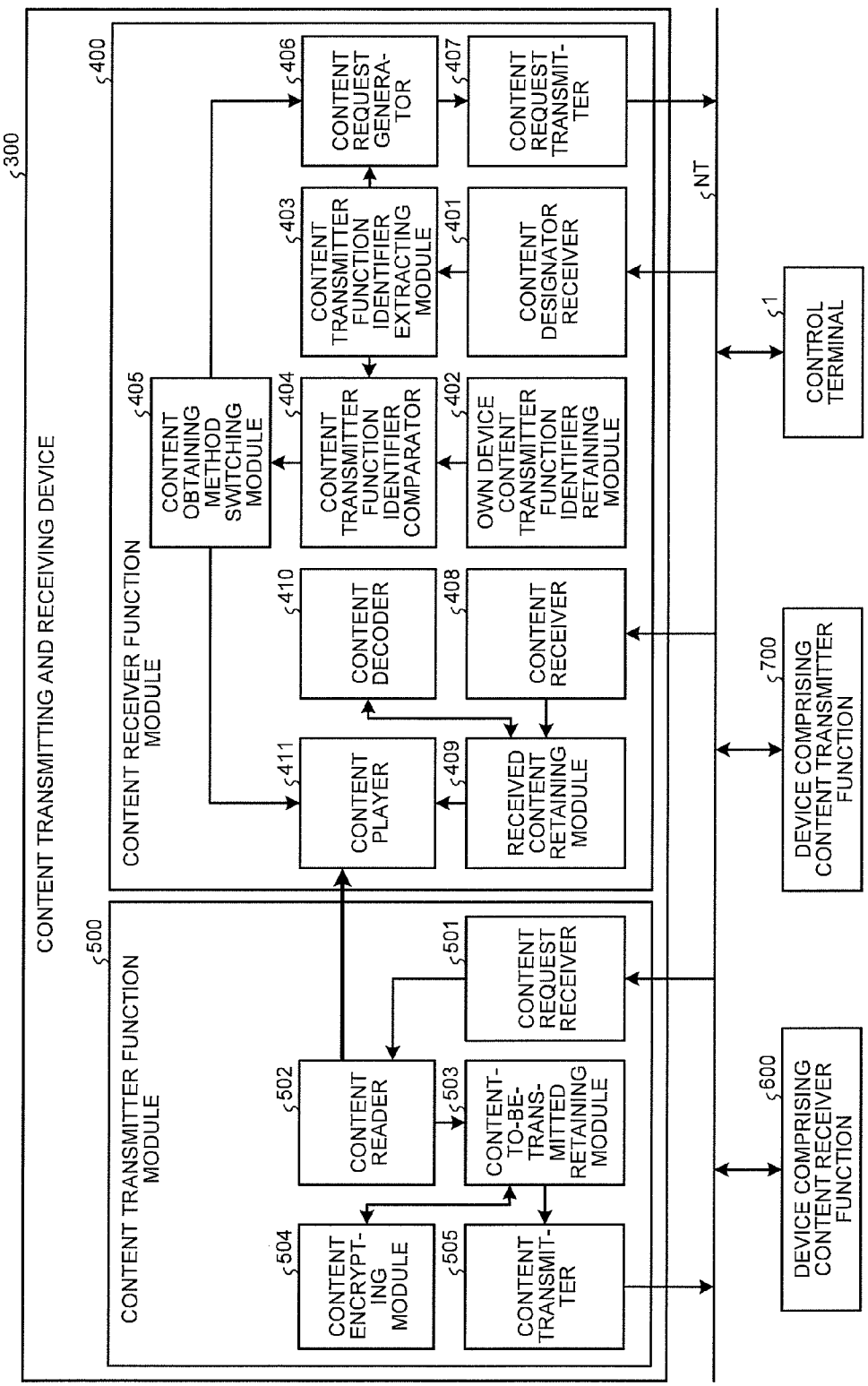
FIG. 5 is an exemplary block diagram of the television receiver as a content transmitting and receiving device connected to an external device comprising a content receiver function, an external device comprising a content transmitter function, and the control terminal in the embodiment.

FIG. 5 is a block diagram of the television receiver 2, as a content transmitting and receiving device 300, connected to an external device 600 comprising a content receiver function, an external device 700 comprising a content transmitter function, and the control terminal 1 over a network. In FIG. 5, to simplify the description, each of the control terminal 1, the content transmitting and receiving device 300, the external device 600 comprising the content receiver function, and the external device 700 comprising the content transmitter function is illustrated in singularity. However, it is not limited to this.

In a content receiver function module 400, a content designator receiver 401 (the network I/F 202 and the CPU 201 in FIG. 4) functions to receive a content designator from the control terminal 1 via the network NT.

An own device content transmitter function identifier retaining module 402 (the HDD 215 or an nonvolatile memory not illustrated in FIG. 4) functions to retain therein a content transmitter function identifier (e.g., 192.168.0.100) for identifying a content transmitter function module 500 included in the same device. In the embodiment, the content receiver function module 400 comprises the own device content transmitter function identifier retaining module 402. Alternatively, the content receiver function module 400 may obtain the content transmitter function identifier from the content transmitter function module 500 included in the same device as required by inquiring thereto, instead of having the own device content transmitter function identifier retaining module 402. Alternatively, a content transmitter function identifier extracting module 403 to be described later may notify the own device content transmitter function module 500 included in the same device of an extracted content transmitter function identifier to cause the content transmitter function module 500 to determine whether the content transmitter function identifier makes a match, the result of which can be thus obtained. In such a configuration, the content transmitter function module 500 comprises a content transmitter function identifier comparator 404 to be described later.

The content transmitter function identifier extracting module 403 (the CPU 201 in FIG. 4) functions to extract a content transmitter function identifier (see FIG. 10) from the received content designator (see FIG. 9). In this embodiment, as a content transmitter function identifier, the IP address of the device 700 comprising the content transmitter function which is contained in the content designator is used.

The content transmitter function identifier comparator 404 (the CPU 201 in FIG. 4) functions to compare the extracted content transmitter function identifier with the content transmitter function identifier of the content transmitter function module 500 in the same device retained in the own device content transmitter function identifier retaining module 402, and to determine if these identifiers match each other.

A content obtaining method switching module 405 (the CPU 201 in FIG. 4) switches content obtaining methods based on the comparison result of the content transmitter function identifiers performed by the content transmitter function identifier comparator 404. When the two content transmitter function identifiers do not match each other, the content obtaining method switching module 405 gives an instruction to a content request generator 406 to generate a content request to be issued to the external device 700 comprising the content transmitter function identified by the content transmitter function identifier. When the two content transmitter function identifiers match each other, the content obtaining method switching module 405 gives an instruction to the content transmitter function module 500 included in the same device to have content transmitted thereto via a content player 411 to be described later. Alternatively, the content obtaining method switching module 405 may issue the instruction directly to the content transmitter function module 500 included in the same device.

The content request generator 406 (the CPU 201 in FIG. 4) generates the content request based on the instruction received from the content obtaining method switching module 405.

A content request transmitter 407 (the network I/F 202 and the CPU 201 in FIG. 4) transmits the content request generated by the content request generator 406 to a corresponding device 700 comprising the content transmitter function over the network NT.

A content receiver 408 (the network I/F 202 and the CPU 201 in FIG. 4) functions to receive the content transmitted from the device 700 comprising the content transmitter function, in response to the content request transmitted by the content request transmitter 407.

A received content retaining module 409 (the memory 204 in FIG. 4) is a buffer for temporarily storing therein content received by the content receiver 408.

A content decoder 410 (the video decoder 206 and the CPU 201 in FIG. 4) functions to decode encrypted content retained in the received content retaining module 409. A process performed by the content decoder 410 is performed according to the Digital Transmission Content Protection over Internet Protocol (DTCP-IP) standard for content protection.

The content player 411 (the CPU 201, the A/V separator 203, the video processing and outputting module 208, the audio decoder 205, the DAC 220, and the amplifier 221 in FIG. 4) functions to replay the decoded content retained in the received content retaining module 409 and content received from the content transmitter function module 500 in the same device. The replayed content is output to a content output device not illustrated in FIG. 5 (the display panel 240 and the speaker 222 in FIG. 4). The content output device may be a device installed inside of the content transmitting and receiving device 300, or an external device connected via the network NT or other interface. Furthermore, the content output device to which the content is output from the content player 411 is not limited to a device for presenting content to users, but may be a storage installed inside of the content transmitting and receiving device 300 or an external storage connected via the network NT or other interface. Even when the content receiver function module 400 is not in operation, the content player 411 may operate as a part of television function.

In the content transmitter function module 500, a content request receiver 501 (the network I/F 202 and the CPU 201 in FIG. 4) functions to receive the content request either from the external device 600 comprising the content receiver function over the network NT or from the content receiver function module 400 included in the same device.

A content reader 502 (the storage I/F 209 and the CPU 201 in FIG. 4) functions to read designated content from a content accumulating module (the HDD 215 in FIG. 4) not illustrated in FIG. 5 based on the received content request. When the source of the content request is the content receiver function module 400 included in the same device, the content reader 502 transmits (internally transfers) the read content to the content receiver function module 400 in the same device in response to the request. The content accumulating module may be a storage installed inside of the content transmitting and receiving device 300 (the HDD 215 in the example in FIG. 4), or may be an external storage connected via the network NT or other interface. Even when the content transmitter function module 500 is not in operation, the content reader 502 may operate as a part of television function.

A content-to-be-transmitted retaining module 503 (the memory 204 in FIG. 4) is a buffer for temporarily storing therein the read content.

A content encrypting module 504 (the CPU 201 or an encoder not illustrated in FIG. 4) functions to encrypt the content-to-be-transmitted retained in the content-to-be-transmitted retaining module 503, and returns the encrypted content to the content-to-be-transmitted retaining module 503. This process performed by the content encrypting module 504 is a process performed according to the DTCP-IP standard for content protection. This encryption is performed when the content is to be transmitted to the external device 600 comprising the content receiver function, and is not performed when the content is transmitted to the content receiver function module 400 of the own device.

A content transmitter 505 (the network I/F 202 and the CPU 201 in FIG. 4) functions to transmit encrypted content-to-be-transmitted retained in the content-to-be-transmitted retaining module 503 to the (external) device 600 comprising the content receiver function that is the source of the received content request.

In the content transmitting and receiving device with the functional configuration explained above, the content player 411 may replay the content read by the content reader 502 even when the content transmitter function module or the content receiver function module is not in operation. An external device comprising either one of the content transmitter function and the content receiver function does not necessary have the configuration described above, but basically has similar functions as those in the content transmitter function module 500 or the content receiver function module 400, except that the mechanism for internally transferring content between the content reader 502 and the content player 411 is missing.

Figure 6:
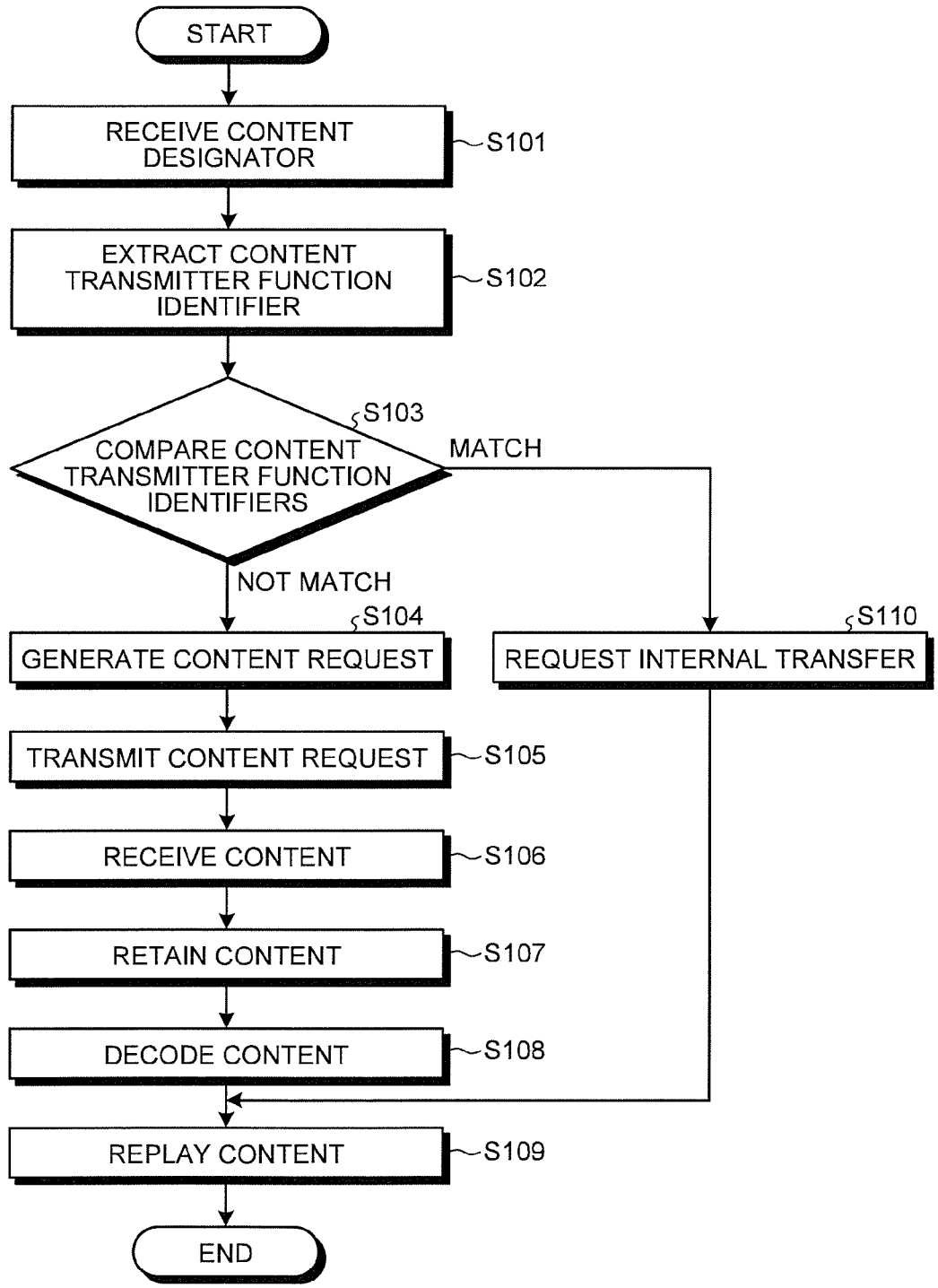
FIG. 6 is an exemplary flowchart of an operation performed when content is transferred between an external device comprising the content transmitter function and the content transmitting and receiving device in the embodiment.
Figure 7:
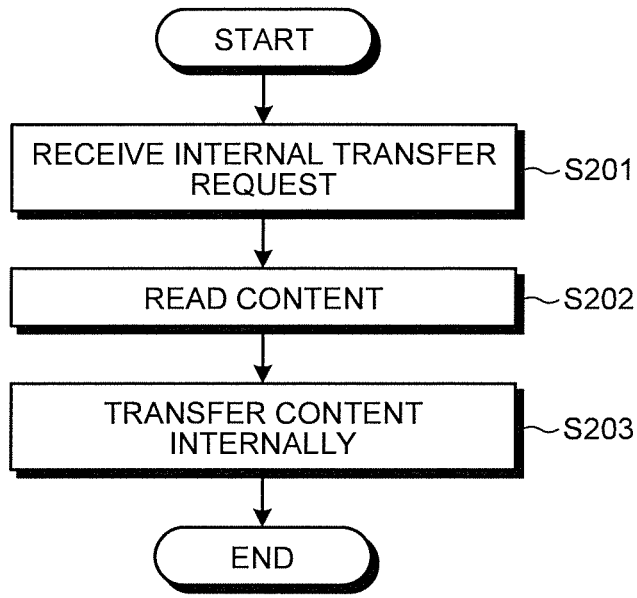
FIG. 7 is an exemplary flowchart of an operation performed by a content transmitter function module in the same device in response to an internal transfer request in the embodiment.
Figure 8:
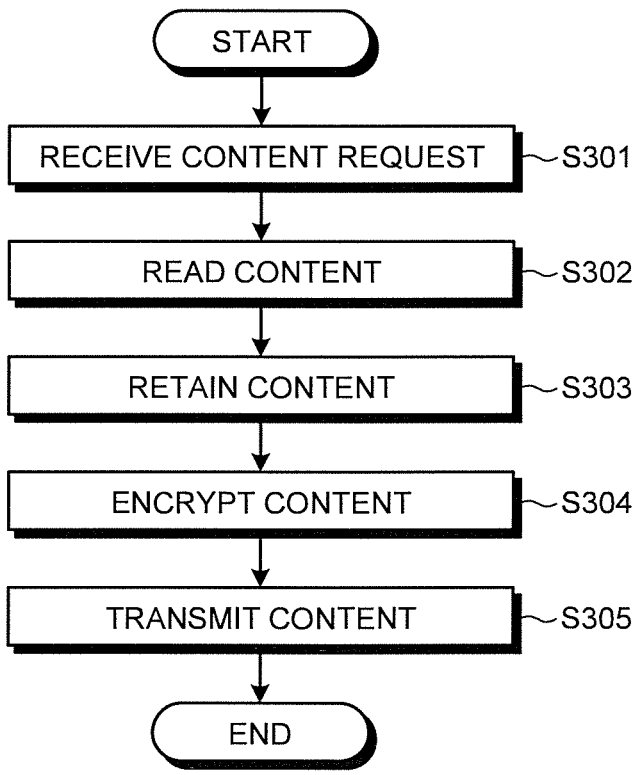
FIG. 8 is an exemplary flowchart of an operation performed when a content transmitter function module in the content transmitting and receiving device receives a content request from an external device comprising the content receiver function or from a content receiver function module in another content transmitting and receiving device in the embodiment.

Explained below with reference to FIGS. 6 to 8 is an operation performed when content is transferred between the external device 700 comprising the content transmitter function or the content transmitter function module 500 of the own device and the content transmitting and receiving device 300 comprising the functional configuration explained above. For the convenience of explanation, each of the modules in the content receiver function module 400 and the content transmitter function module 500 will be explained to function autonomously. However, in a configuration in which a controller of the content transmitting and receiving device 300, e.g., the CPU 201 in the television receiver 2, controls the entire device, it is the controller that operates the functions described above in cooperation with each hardware element. In such a case, the CPU reads a content transmitting and receiving program stored in a ROM or the like and executes the program to cause each of the hardware elements to operate in cooperation.

Operation Performed by Content Receiver Function Module in Content Transmitting and Receiving Device To begin with, an operation performed when content is transferred between the external device 700 comprising the content transmitter function and the content transmitting and receiving device 300 will be explained with reference to the flowchart illustrated in FIG. 6.

When the content designator receiver 401 in the content receiver function module 400 in the content transmitting and receiving device 300 receives a content designator from the control terminal 1 (S101), the content transmitter function identifier extracting module 403 extracts a content transmitter function identifier from the received content designator (S102).

The content transmitter function identifier comparator 404 then compares the content transmitter function identifier of the content transmitter function module 500 in the same device retained in the own device content transmitter function identifier retaining module 402 with the content transmitter function identifier extracted from the content designator by the content transmitter function identifier extracting module 403 (S103).

If the content transmitter function identifier comparator 404 determines that these two content transmitter function identifiers do not match each other as a result of the comparison performed at S103, the content transmitter function identifier comparator 404 instructs the content request generator 406 to generate a content request. The content request generator 406 then generates the content request based on the instruction issued by the content obtaining method switching module 405, the content designator, and the content transmitter function identifier (S104).

The content request transmitter 407 transmits the generated content request to the corresponding external device 700 comprising the content transmitter function over the network NT as an HTTP GET request message (S105).

The content receiver 408 receives the content transmitted by the external device 700 comprising the content transmitter function over the network NT in response to the content request (S106).

The received content retaining module 409 retains therein the content received by the content receiver 408 (S107).

The content decoder 410 decodes the content retained in the received content retaining module 409, and returns the decoded content to the received content retaining module 409 (S108).

The content player 411 replays the decoded content retained in the received content retaining module 409 (S109).

On the other hand, if the two content transmitter function identifiers are determined to match each other in the comparison performed at S103, the content transmitter function identifier comparator 404 in the content transmitter function module 500 requests the content reader 502 in the content transmitter function module 500 included in the same device to perform an internal transfer (S110).

At S109, the content transferred in response to the internal transfer request issued at S110 by the content reader 502 in the content transmitter function module 500 included in the same device is replayed (S109).

Operation Performed by Content Transmitter Function Module in Content Transmitting and Receiving Device An operation performed by the content transmitter function module 500 included in the same device in response to the internal transfer request will now be explained with reference to the flowchart illustrated in FIG. 7.

Upon receiving an internal transfer request from the content obtaining method switching module 405 in the content receiver function module 400 included in the same device (S201), the content reader 502 included in the content transmitter function module 500 reads designated content from the content accumulating module not illustrated based on the instruction from the content obtaining method switching module 405 (S202).

The content reader 502 then transfers the content read from the content accumulating module to the content player 411 in the content receiver function module 400 included in the same device not over the network NT but through a path inside the device (S203). The content thus internally transferred will be replayed by the content player 411 included in the content receiver function module 400.

Second Operation Performed by Content Transmitter Function Module in Content Transmitting and Receiving Device For reference, explained below with reference to the flowchart in FIG. 8 is an operation performed when the content transmitter function module 500 in the content transmitting and receiving device 300 according to the embodiment receives a content request from the external device 600 comprising the content receiver function or the content receiver function module 400 in another content transmitting and receiving device 300 over the network NT.

To begin with, when the content request receiver 501 in the content transmitter function module 500 included in the content transmitting and receiving device 300 receives a content request from an external device over the network NT (S301), the content reader 502 reads designated content from the content accumulating module not illustrated based on the received content request (S302).

The content-to-be-transmitted retaining module 503 retains therein the content read from the content accumulating module (S303).

The content encrypting module 504 then encrypts the content retained in the content-to-be-transmitted retaining module 503, and returns the encrypted content to the content-to-be-transmitted retaining module 503 (S304).

The content transmitter 505 then transmits the encrypted content retained in the content-to-be-transmitted retaining module 503 to the source of the content request based on the request received at S301 (S305).

The configurations and the operations of the content transmitting and receiving device have been explained. In a network system of electronics devices compliant with the UPnP (trademark) AV standard and the DLNA guidelines, users select content without distinguishing devices comprising the content transmitter function. Therefore, the device comprising the content transmitter function retaining therein the selected content may be same as the designated device comprising the content receiver function. Even in such a situation, when the transmitter and the receiver of the content are included in the same device, the content transmitting and receiving device according to the embodiment transfers the content internally within the same device by using the content obtaining method switching module 405 as explained above. In this manner, the network transferring process required in transferring content over a network can be omitted, whereby consumption of device resources is reduced. Furthermore, because consumption of resources required in the network transferring process is reduced, another process can be executed simultaneously using the resources thus reduced, and the content can be obtained without causing contentions for resources that are to be used. Furthermore, the time delay between reading and replaying the content can be reduced.

The UPnP (trademark) AV standard specifies a protocol type called "internal" used by a media server and a media renderer to indicate in-device transfer as content transfer protocol information. However, the protocol type "internal" is not currently generally used, and the guidelines issued by the industrial organization DLNA aiming to ensure interoperability does not even mention it. Therefore, an existing control point cannot be expected to perform a preferable operation for internal transfer. Considering this, the content transmitting and receiving device according to the embodiment operates based on general operations of the control point without depending on the specifications of exiting individual control terminals (control points: UPnP (trademark) AV Control Points). Therefore, any control terminal can be used in recognizing if content can be transferred within the same device and switching transfer schemes appropriately.

Furthermore, the user operating a control terminal can have content transferred without being aware if the transmitting device retaining therein the content is the same device as the device that will receive the content.

Other Embodiments

In a configuration in which the controller of the content transmitting and receiving device 300 controls the entire device, as in the case with the CPU 201 in the television receiver 2 mentioned earlier, the controller operates various functions in cooperation with each hardware element. In such a configuration, the CPU making up the controller reads a content transmitting and receiving program and executes the program. In this case, the content transmitting and receiving program executed on the content transmitting and receiving device according to the embodiment is provided in a manner incorporated in a ROM or the like in advance. Even in such a configuration in which the content transmitting and receiving program causes a predetermined controller to operate in cooperation with each hardware element to realize each of the functional modules in the content transmitting and receiving device 300, the device can operate in the same manner as the content transmitting and receiving device 300. Therefore, the content transmitting and receiving program can be considered to be one of the embodiments. Such a computer program may also be provided in a manner recorded in a computer-readable recording medium, such as a compact disk read-only memory (CD-ROM), a flexible disk (FD), a compact disk recordable (CD-R), and a digital versatile disk (DVD), as a file in an installable or executable format, or may be stored in a computer connected to a network such as the Internet to be downloaded and distributed over the network.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A content transmitting and receiving device comprising:
    a content receiver function module configured to receive and to replay content;
    a content transmitter function module configured to transmit designated content;
    a content designator receiver configured to receive a content designator as a uniform resource identifier (URI) over a network;
    a content transmitter function identifier extracting module configured to extract a content transmitter function identifier from the received content designator;
    a content transmitter function identifier comparator configured to compare the extracted content transmitter function identifier with a content transmitter function identifier stored in the content transmitting and receiving device;

a content obtaining method switching module configured to switch between internal transfer of content and external transfer of content over the network based on a result of a comparison performed by the content transmitter function identifier comparator; and a content reader configured to read designated content from a content accumulating module, wherein if the content obtaining method switching module switches to the internal transfer, the content reader transmits the read designated content to the content receiver function module through the internal transfer.

2. The content transmitting and receiving device of claim 1, wherein the content receiver function module comprises a content player, the content obtaining method switching module is configured to switch to the internal transfer when the extracted content transmitter function identifier is identical to the stored content transmitter function identifier as the result of the comparison, and according to the switching, the content reader is configured to read content from the content accumulating module and to transfer the content to the content player.

3. The content transmitting and receiving device of claim 1, wherein the content transmitter function module further comprises a content encrypting module configured to encrypt content, and a content transmitter configured to transmit encrypted content to an external device comprising a content receiver function over the network, the content obtaining method switching module is configured to switch to the external transfer over the network if the extracted content transmitter function identifier is not identical to the stored content transmitter function identifier as the result of the comparison, and according to the switching, the content encrypting module is configured to encrypt unencrypted content read by the content reader, and the content transmitter is configured to transmit the encrypted content to the external device over the network.

4. The content transmitting and receiving device of claim 1, wherein the content transmitter function module and a device comprising a content transmitter function are configured to be the Universal Plug and Play (trademark) Audio Visual (UPnP AV) Media Servers, the content receiver function module and a device comprising a content receiver function are configured to be the UPnP (trademark) AV Media Renderers, and a control terminal is configured to be the UPnP (trademark) AV Control Point.

5. The content transmitting and receiving device of claim 4, wherein the content designator is received from the control terminal through an action specified in the UPnP (trademark) AV Transport Service.

6. The content transmitting and receiving device of claim 5, wherein the content transmitter function identifier contains an Internet Protocol (IP) address used in receiving content from one of both the content transmitter function module and a device comprising a content transmitter function.

7. A content transmitting and receiving method executed by a content transmitting and receiving device comprising a content receiver function module and a content transmitter function module, the content transmitting and receiving method comprising:

receiving and replaying, by the content receiver function module, content;

transmitting, by the content transmitter function module, designated content;

receiving, by a content designator receiver, a content designator as a uniform resource identifier (URI) over a network;

extracting, by a content transmitter function identifier extracting module, a content transmitter function identifier from the received content designator;

comparing, by a content transmitter function identifier comparator, the extracted content transmitter function identifier with a content transmitter function identifier stored in the content transmitting and receiving device;

switching, by a content obtaining method switching module, between internal transfer of content and external transfer of content over the network based on a result of a comparison performed by the content transmitter function identifier comparator; and reading, by a content reader, designated content from a content accumulating module, wherein if the content obtaining method switching module switches to the internal transfer, the content reader transmits the read designated content to the content receiver function module through the internal transfer.

8. The content transmitting and receiving method of claim 7, wherein the content receiver function module comprises a content player, the content obtaining method switching module is configured to switch to the internal transfer when the extracted content transmitter function identifier is identical to the stored content transmitter function identifier as the result of the comparison, and according to the switching, the content reader is configured to read content from the content accumulating module and to transfer the content to the content player.

9. The content transmitting and receiving method of claim 7, wherein the content transmitter function module further comprises a content encrypting module configured to encrypt content, and a content transmitter configured to transmit encrypted content to an external device comprising a content receiver function over the network, the content obtaining method switching module is configured to switch to the external transfer over the network if the extracted content transmitter function identifier is not identical to the stored content transmitter function identifier as the result of the comparison, and according to the switching, the content encrypting module is configured to encrypt unencrypted content read by the content reader, and the content transmitter is configured to transmit the encrypted content to the external device over the network.

10. The content transmitting and receiving method of claim 7, wherein the content transmitter function module and a device comprising a content transmitter function are configured to be the Universal Plug and Play (trademark) Audio Visual (UPnP AV) Media Servers, the content receiver function module and a device comprising a content receiver function are configured to be the UPnP (trademark) AV Media Renderers, and a control terminal is configured to be the UPnP (trademark) AV Control Point.

11. The content transmitting and receiving device of claim 10, wherein the content designator is received from the control terminal through an action specified in the UPnP (trademark) AV Transport Service.

12. The content transmitting and receiving method of claim 11, wherein the content transmitter function identifier contains an Internet Protocol (IP) address used in receiving content from one of both the content transmitter function module and a device comprising a content transmitter function.

13. A content transmitting and receiving computer program product having a non-transitory computer readable medium including programmed instructions executed by a content transmitting and receiving device comprising a content receiver function module and a content transmitter function module, wherein the instructions, when executed by a computer, cause the computer to perform:
 receiving and replaying, by the content receiver function module, content;
 transmitting, by the content transmitter function module, designated content,
 receiving, by a content designator receiver, a content designator as a uniform resource identifier (URI) over a network;
 extracting, by a content transmitter function identifier extracting module, a content transmitter function identifier from the received content designator;
 comparing, by a content transmitter function identifier comparator, the extracted content transmitter function identifier with a content transmitter function identifier stored in the content transmitting and receiving device;
 switching, by a content obtaining method switching module, between internal transfer of content and external transfer of content over the network based on a result of a comparison performed by the content transmitter function identifier comparator; and
 reading, by a content reader, designated content from a content accumulating module, wherein
 if the content obtaining method switching module switches to the internal transfer, the content reader transmits the read designated content to the content receiver function module through the internal transfer.

14. The content transmitting and receiving device of claim 1, wherein, in the internal transfer, at least a portion of processing of an encrypting and decoding based on DTCP-IP, HTTP, and RTSP is omitted from among content transfer processing to be executed in the external transfer.

15. The content transmitting and receiving method of claim 7, wherein, in the internal transfer, at least a portion of processing of an encrypting and decoding based on DTCP-IP, HTTP, and RTSP is omitted from among content transfer processing to be executed in the external transfer.

16. The content transmitting and receiving computer program product of claim 13, wherein, in the internal transfer, at least a portion of processing of an encrypting and decoding based on DTCP-IP, HTTP, and RTSP is omitted from among content transfer processing to be executed in the external transfer.

* * * * *